(12) United States Patent
Takahashi (10) Patent No.: US 11,277,534 B2
(45) Date of Patent: Mar. 15, 2022

(54) IMAGE READING APPARATUS AND METHOD FOR CONTROLLING IMAGE READING APPARATUS

(71) Applicant: KYOCERA Document Solutions Inc., Osaka (JP)

(72) Inventor: Masayoshi Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 625 days.

(21) Appl. No.: 16/323,891

(22) PCT Filed: Jun. 13, 2018

(86) PCT No.: PCT/JP2018/022515
§ 371 (c)(1),
(2) Date: Feb. 7, 2019

(87) PCT Pub. No.: WO2019/035272
PCT Pub. Date: Feb. 21, 2019

(65) Prior Publication Data
US 2021/0385345 A1    Dec. 9, 2021

(30) Foreign Application Priority Data

Aug. 18, 2017  (JP) .............................. JP2017-157843

(51) Int. Cl.
*H04N 1/00* (2006.01)
*H04N 1/10* (2006.01)

(52) U.S. Cl.
CPC ..... *H04N 1/00708* (2013.01); *H04N 1/00737* (2013.01); *H04N 1/00896* (2013.01); *H04N 1/1065* (2013.01); *H04N 2201/0094* (2013.01)

(58) Field of Classification Search
CPC .......... B65H 2511/13; B65H 2511/212; B65H 2220/01; B65H 2220/02;
(Continued)

(56) References Cited

U.S. PATENT DOCUMENTS 10,353,652 B2 * 7/2019 Herrmann ............. G06F 3/1234
2006/0203306 A1   9/2006 Hoshi .......................... 358/497
(Continued)

FOREIGN PATENT DOCUMENTS

JP    H 11-75025 A    3/1999
JP    2006-287901 A   10/2006
(Continued)

OTHER PUBLICATIONS

European Patent Office dated Apr. 22, 2021, issued to corresponding European Application No. 18836586.0.

*Primary Examiner* — Negussie Worku
(74) *Attorney, Agent, or Firm* — Stein IP, LLC (57) ABSTRACT

An image reading apparatus includes a reading controller, a data generating circuit unit, a document holder, an opening/closing sensor which provides an output of a first level when the document holder is open by an angle equal to or more than a predetermined angle, and a storage unit which stores an adjustment value. Where a return is made from a power saving mode to an active mode, when an output level of the opening/closing sensor is the first level, the reading controller makes a setting for an operation of the data generating circuit unit based on the adjustment value stored in the storage unit, and then makes the reading unit perform reading for document size detection.

10 Claims, 8 Drawing Sheets

(58) Field of Classification Search
CPC .... B65H 2404/6111; B65H 2404/7414; B65H 2515/82; B65H 2601/521; B65H 5/062; B65H 5/36; G03G 15/5004; G03G 15/5016; G03G 15/602; G03G 15/6529; G03G 15/80; G03G 2215/00679; H04N 2201/0094; H04N 1/00891; H04N 1/00904; H04N 1/00559; H04N 1/0032; H04N 1/00323; H04N 1/00549; H04N 1/00554; H04N 1/00557; H04N 1/00615; H04N 1/00618; H04N 1/0066; H04N 1/00806; H04N 1/00822; H04N 1/00885; H04N 1/00888; H04N 1/00896; H04N 1/00899; H04N 1/00976; H04N 1/028; H04N 1/58; H04N 5/332; H04N 5/3694; H04N 1/00541; H04N 1/1061; H04N 1/19594; H04N 2201/0081; H04N 2201/0084; H04N 1/00013; H04N 1/00045; H04N 1/0005; H04N 1/00055; H04N 1/00063; H04N 1/00082; H04N 1/00551; H04N 1/00708; H04N 1/036; H04N 1/1039; H04N 1/1065; H04N 1/401; H04N 1/4015; H04N 1/4076; H04N 2201/0005; H04N 2201/0432
USPC ..................................................... 358/406
See application file for complete search history.

(56) References Cited

U.S. PATENT DOCUMENTS

| | | | |
|---|---|---|---|
| 2015/0281498 A1* | 10/2015 | Furushige | H04N 1/00888 358/1.13 |
| 2016/0065754 A1 | 3/2016 | Kurahashi | 1/82 |
| 2016/0142586 A1* | 5/2016 | Ishida | G06K 15/14 358/1.12 |
| 2019/0089860 A1* | 3/2019 | Fuchigami | H04N 1/19594 |

FOREIGN PATENT DOCUMENTS

| | | |
|---|---|---|
| JP | 2015-159351 A | 9/2015 |
| JP | 2016-48840 A | 4/2016 |

\* cited by examiner

IMAGE READING APPARATUS AND METHOD FOR CONTROLLING IMAGE READING APPARATUS

CROSS-REFERENCE TO RELATED APPLICATIONS

This application is a national stage of International Application No. PCT/JP2018/022515, filed Jun. 13, 2018, which claims the benefit of priority to Japanese Application No. 2017-157843, filed Aug. 18, 2017, in the Japanese Patent Office, the disclosures of which are incorporated herein in its entirety by reference.

TECHNICAL FIELD

The present invention relates to image reading apparatuses which read a document to generate image data.

BACKGROUND ART

An image reading apparatus reads a document by means of an image sensor to generate image data. Multifunction peripherals and copiers are kinds of image reading apparatuses. Some image reading apparatuses have a function of detecting the size of a set document based on image data obtained by reading. One example of image reading apparatuses that perform such size detection is disclosed in Patent Literature 1.

Specifically, Patent Document 1 discloses an image reading apparatus that includes a line sensor which converts optical information received from a document into an electric signal, an A/D converter which converts an output of the line sensor into digital data, and a controller which controls image reading processing. The image reading apparatus performs a first scanning operation of scanning the document in a main scanning direction with a platen cover not closed, subsequently performs a second scanning operation of scanning the document in the main scanning direction with the platen cover closed, and determines a size of the document based on outputs of the line sensor obtained by these two scanning operations (see claim 1 of Patent Document 1).

CITATION LIST

Patent Literature

Patent Literature 1: Japanese Patent Application Publication No. H11-075025

SUMMARY OF INVENTION

Technical Problem

Some image reading apparatuses has a power saving mode. The power saving mode is a mode in which power consumption is reduced. In the power saving mode, electric power is not supplied to a predetermined portion (a supply-stop portion). In the power saving mode, supply of electric power to, for example, a control circuit, an image sensor, and a circuit (image processing circuit) which generates image data based on an output of the image sensor is stopped.

When the power saving mode is canceled, supply of electric power to the supply-stop portions is restarted. The portions, to which supply of electric power is restarted, start up to operate. When the power saving mode is canceled, a document is read, and return processing is performed to return to a state where image data can be generated. There is a case where reading is sometimes performed in the process of returning to such a state, and based on the result of the reading, a setting (setting value) is made for operation of the image processing circuit. For example, reading of a white reference plate inside the image reading apparatus is performed.

On the other hand, in image reading apparatuses, there is a case where a document glass is read by means of an image sensor to detect a size of a document. That is, a document placed on the document glass is read, and based on the result of the reading, the size of the document is determined. Here, the reading is performed in making a setting for an operation of the image processing circuit. Reading is performed also in detecting the size of the document. Thus, it is impossible to detect the size of the document while the setting is being made for the operation of the image processing circuit in response to the cancellation of the power saving mode. This is disadvantageous, because a user who desires automatic detection of the document size has to wait until the making of the setting for the operation of the image processing circuit is completed.

To avoid keeping the user waiting, a higher priority may always be given to the detection of document size than to the making of a setting for the operation of the image processing circuit. Then, however, even when there is no need of detecting a document size, the setting for the operation of the image processing circuit is not made immediately, which is inconvenient. Normally, when the user performs a predetermined operation with respect to the apparatus, the power saving mode is canceled. For example, the opening/closing of a document holder, which holds a document, may be used as a trigger to cancel the power saving mode. The document holder is opened and closed to set a document. Hence, the detection of the document size may be performed before making the setting for the operation of the image processing circuit only when opening and closing of the document holder are performed.

In other words, however, in cases of return made otherwise than by the opening and closing of the document holder, priority is given to the making of the setting for the operation of the image processing circuit. With such a simple control, document size detection may not be given priority when it should be.

According to the technique disclosed in Patent Literature 1, it is possible to detect a size of a document. However, Patent Literature 1 does not disclose anything about processing performed at a time of cancelling the power saving mode. Thus, the above-described problem is not solved in Patent Literature 1.

The present invention, in view of the problem in the above-described conventional art, appropriately determines whether priority should be given to document size detection, regardless of the factor for returning from the power saving mode.

Solution to Problem

To achieve the above object, an image reading apparatus according to claim 1 includes a document stage, a reading controller, a reading unit, a data generating circuit unit, a document holder, an opening/closing sensor, a power supply device, and a storage unit. The reading unit includes an image sensor and reads a document set on the document stage. The data generating circuit unit generates image data based on an output of the image sensor. The document holder is openable and closable and holds the document stage. The opening/closing sensor provides an output of a first level when the document holder is open by a predetermined angle or more. The opening/closing sensor provides an output of a second level when the document holder is not open by an angle equal to or more than the predetermined angle. The power supply device stops supply of electric power to the reading controller and the data generating circuit unit in a power saving mode. The power supply device supplies electric power to the reading controller and to the data generating circuit unit in an active mode. The storage unit stores an adjustment value for making a setting for an operation of the data generating circuit unit. In a case where a return is made from the power saving mode to the active mode, the reading controller performs predetermined common processing. The reading controller checks an output of the opening/closing sensor on completion of the common processing. When the output level of the opening/closing sensor is the first level, the reading controller makes the setting for the operation of the data generating circuit unit based on the adjustment value stored in the storage unit. After making the setting, the reading controller makes the reading unit perform reading for determination of a size of the document. The reading controller detects a size of the document based on a result of the reading. The common processing includes processing of stabilizing, and enabling operations of, a device included in the reading controller and a device included in the data generating circuit unit.

Advantageous Effects of Invention

According to the present invention, it is possible to appropriately determine whether priority should be given to document size detection, regardless of the factor for returning from the power saving mode.

DESCRIPTION OF EMBODIMENTS

Hereinafter, by using FIG. 1 to FIG. 8, a description will be given of an image reading apparatus according to an embodiment. The description will be given by taking a multifunction peripheral 100 as an example of the image reading apparatus. The multifunction peripheral 100 is capable of performing printing and transmission besides document reading. The multifunction peripheral 100 functions as an image forming apparatus, too. It should be understood that factors such as configurations and arrangements described herein are not limitations to the scope of the invention but merely illustrative examples.

(Multifunction Peripheral 100)

Figure 1:
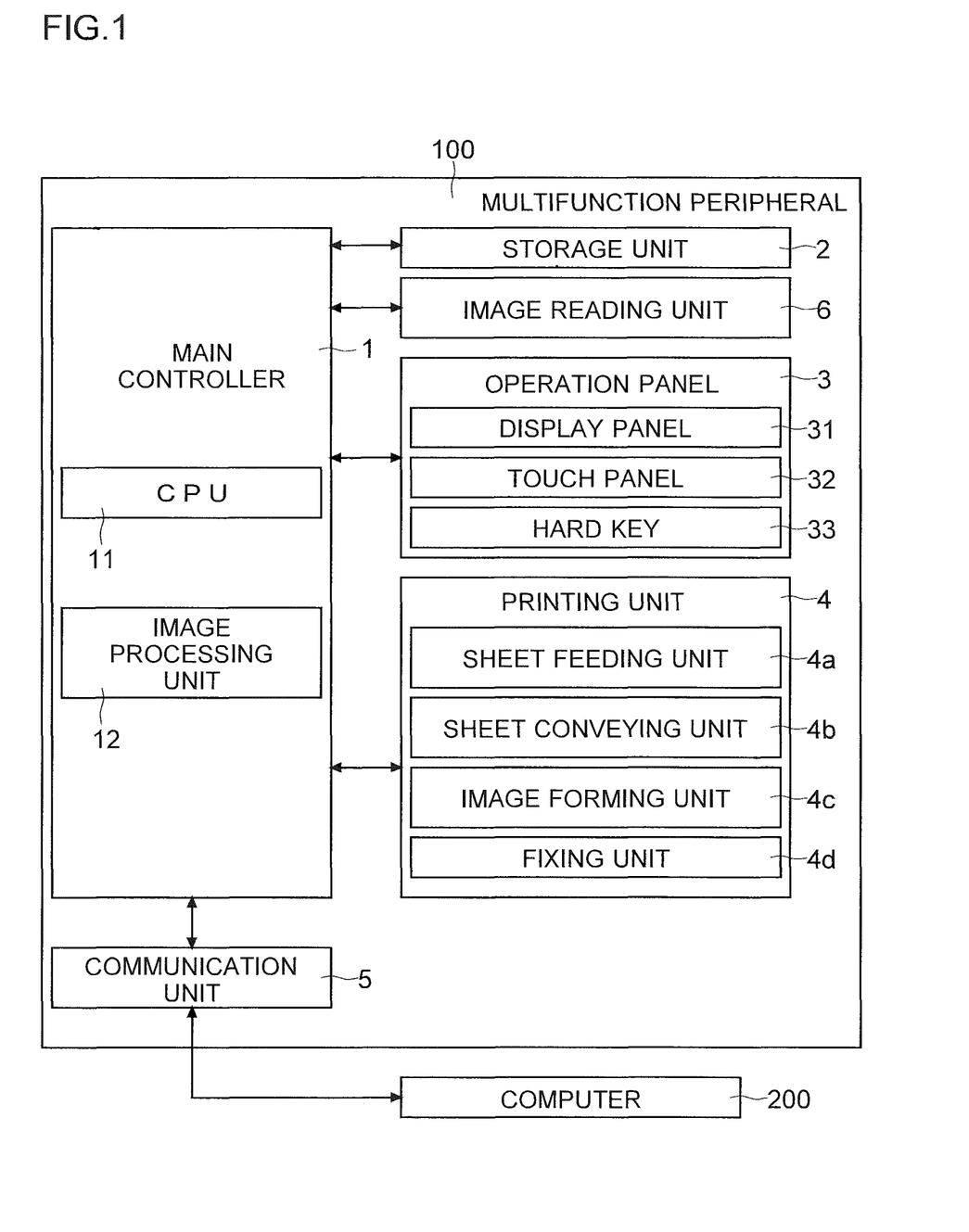
FIG. 1 is a diagram illustrating an example of a multifunction peripheral according to an embodiment.

With reference to FIG. 1, a description will be given of an example of the multifunction peripheral 100 according to the embodiment. FIG. 1 is a diagram illustrating an example of the multifunction peripheral 100 according to the embodiment.

As illustrated in FIG. 1, the multifunction peripheral 100 includes a main controller 1, a storage unit 2, an operation panel 3, a printing unit 4, a communication unit 5, and an image reading unit 6.

The main controller 1 controls the multifunction peripheral 100. The main controller 1 includes a CPU 11 and an image processing unit 12. The storage unit 2 includes a nonvolatile storage device, examples of which are a ROM, a flash ROM, a storage device (HDD), etc. The storage unit 2 also includes a volatile storage device, examples of which are a RAM, etc. The main controller 1 controls each portion by using a program and data stored in the storage unit 2. In jobs such as copying and transmission, the main controller 1 controls document reading. The main controller 1 also controls printing, transmission, and image data storage. The image processing unit 12 performs image processing on image data.

The operation panel 3 includes a display panel 31, a touch panel 32, and hard keys 33. The main controller 1 makes the display panel 31 display a setting screen, operation images, etc. The operation images include buttons, keys, and tabs, for example. Based on an output of the touch panel 32, the main controller 1 recognizes which one of the operation images has been operated. The hard keys 33 include a start key, a ten-key pad, etc. The touch panel 32 and the hard keys 33 accept setting operations (operations related to jobs) performed by a user. The main controller 1 communicates with the operation panel 3. The main controller 1 recognizes setting details.

The printing unit 4 includes a sheet feeding unit 4a, a sheet conveying unit 4b, an image forming unit 4c, and a fixing unit 4d. In the printing job, the main controller 1 makes the sheet feeding unit 4a supply a sheet to the sheet conveying unit 4b. The main controller 1 makes the sheet conveying unit 4b convey the sheet. The sheet conveying unit 4b discharges the sheet outside the apparatus after printing is performed on the sheet. The main controller 1 makes the image forming unit 4c form a toner image based on image data. The main controller 1 makes the image forming unit 4c transfer the toner image onto the sheet when the sheet is conveyed to the image forming unit 4c. The main controller 1 makes the fixing unit 4d fix the transferred toner image on the sheet. The main controller 1 controls the operation of the printing unit 4.

The communication unit 5 is connected to a computer 200 to communicate with the computer 200. The communication unit 5 and the computer 200 communicate with each other via a network. The communication unit 5 includes a communication circuit and communication software. The communication unit 5 receives printing data transmitted from the computer 200. The printing data includes image data and data written in page description language. The main controller 1 makes the printing unit 4 perform printing based on the received printing data (print job).

(Image Reading Unit 6)

Figure 2:
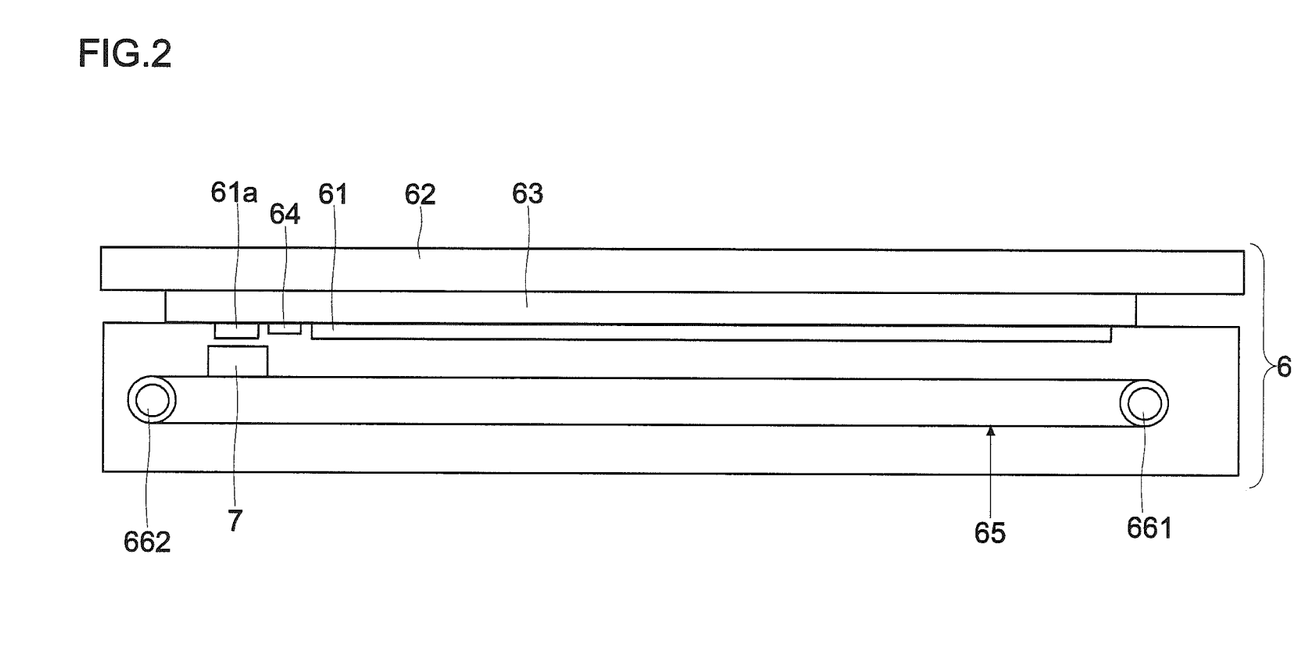
FIG. 2 is a diagram illustrating an example of an image reading unit according to the embodiment.
Figure 3:
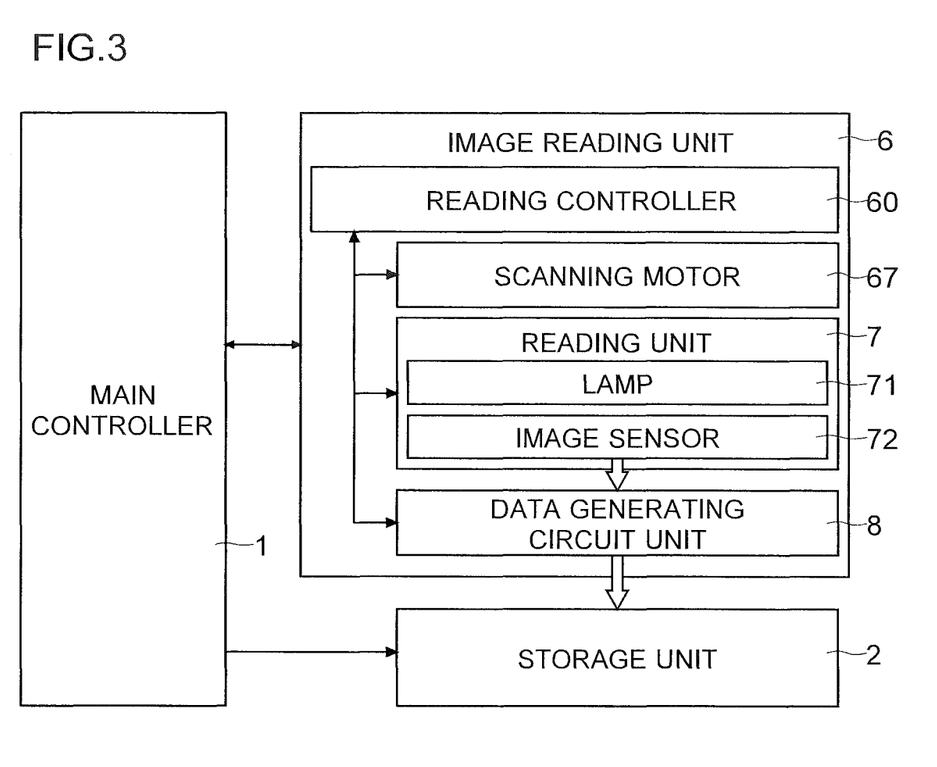
FIG. 3 is a diagram illustrating the example of the image reading unit according to the embodiment.

Next, by using FIGS. 2 and 3, the image reading unit 6 according to the embodiment will be described. FIG. 2 and FIG. 3 are diagrams illustrating an example of the image reading unit 6 according to the embodiment.

On a right side of an upper surface of the image reading unit 6, a document glass 61 (corresponding to a document stage) is disposed. The document glass 61 transmits light. A document is set on the document glass 61. The image reading unit 6 irradiates the document set on the document glass 61 with light. The image processing unit 12 reads a downward facing side of the document and generates image data. The main controller 1 makes the storage unit 2 store the generated image data.

As illustrated in FIG. 2, the document holder 62 is provided above the image reading unit 6. The document holder 62 is openable and closable. The document holder 62 is openable and closable by vertically swinging it on a front side of the multifunction peripheral 100. FIG. 2 illustrates a state where the document holder 62 is closed. To a lower surface of the document holder 62, there is attached a document holding plate 63. The document holding plate 63 is a white plate, for example. With the document holder 62 closed, the document holding plate 63 covers the document glass 61 from above. The document holding plate 63 holds a document set on the document glass 61 from above.

Here, instead of the document holder 62, a document conveying device may be attached. The document conveying device also holds a document placed on the document glass 61. The document conveying device is a device that automatically conveys set documents one by one. To read a conveyed document, the image reading unit 6 is provided with a conveyance reading glass 61a. In FIG. 2, the conveyance reading glass 61a is provided to the left of the document glass 61. The conveyed document passes over the conveyance reading glass 61a. In this case, a reading control unit 60 positions a reading unit 7 below the conveyance reading glass 61a.

As illustrated in FIG. 3, the image reading unit 6 includes the reading control unit 60. The reading control unit 60 is a board that controls the operation of the image reading unit 6. The reading control unit 60 includes a control circuit 60a, a memory 60b, and other circuits. The reading control unit 60 receives instructions and signals from the main controller 1, and performs document reading.

As illustrated in FIG. 2, the image reading unit 6 includes the reading unit 7, a white reference plate 64, a belt 65, a pulley 661, and a pulley 662. The reading unit 7 is a CIS-type scan unit. The belt 65, the pulley 661, and the pulley 662 constitute a mechanism for moving the reading unit 7. The belt 65 is an endless belt. The belt 65 is wound around the pulleys. The belt 65 and the reading unit 7 are connected to each other. A scanning motor 67 is provided in the image reading unit 6 (see FIG. 3). The scanning motor 67 makes the pulley 662 rotate. The scanning motor 67 is rotatable both forward and backward. To move the reading unit 7, the reading controller 60 makes the scanning motor 67 rotate. As a result, the belt 65 rotates. Along with the rotation of the belt 65, the reading unit 7 moves in a horizontal direction (a sub scanning direction, the left-right direction in FIG. 2). For document reading, the reading controller 60 makes the reading unit 7 move in the sub scanning direction. The white reference plate 64 is provided (on the right side in FIG. 2) near the document glass 61. The white reference plate 64 is so positioned as to be able to be read by the reading unit 7.

As illustrated in FIG. 3, the reading unit 7 includes a lamp 71 and an image sensor 72. The reading unit 7 reads a document set on the document glass 61. The lamp 71 irradiates the document with light. The image sensor 72 includes a plurality of light receiving elements (pixels). The light receiving elements are aligned in a main scanning direction. The image sensor 72 is a line sensor, for example. Light reflected by the document or the document holding plate 63 enters the light receiving elements. Each of the light receiving elements outputs an analog image signal corresponding to an amount of light received (reflected light amount). The image reading unit 6 includes a data generating circuit unit 8. Based on the analog image signal outputted from the image sensor 72, the data generating circuit unit 8 generates image data.

(Reading Controller 60 and Data Generating Circuit Unit 8)

Figure 4:
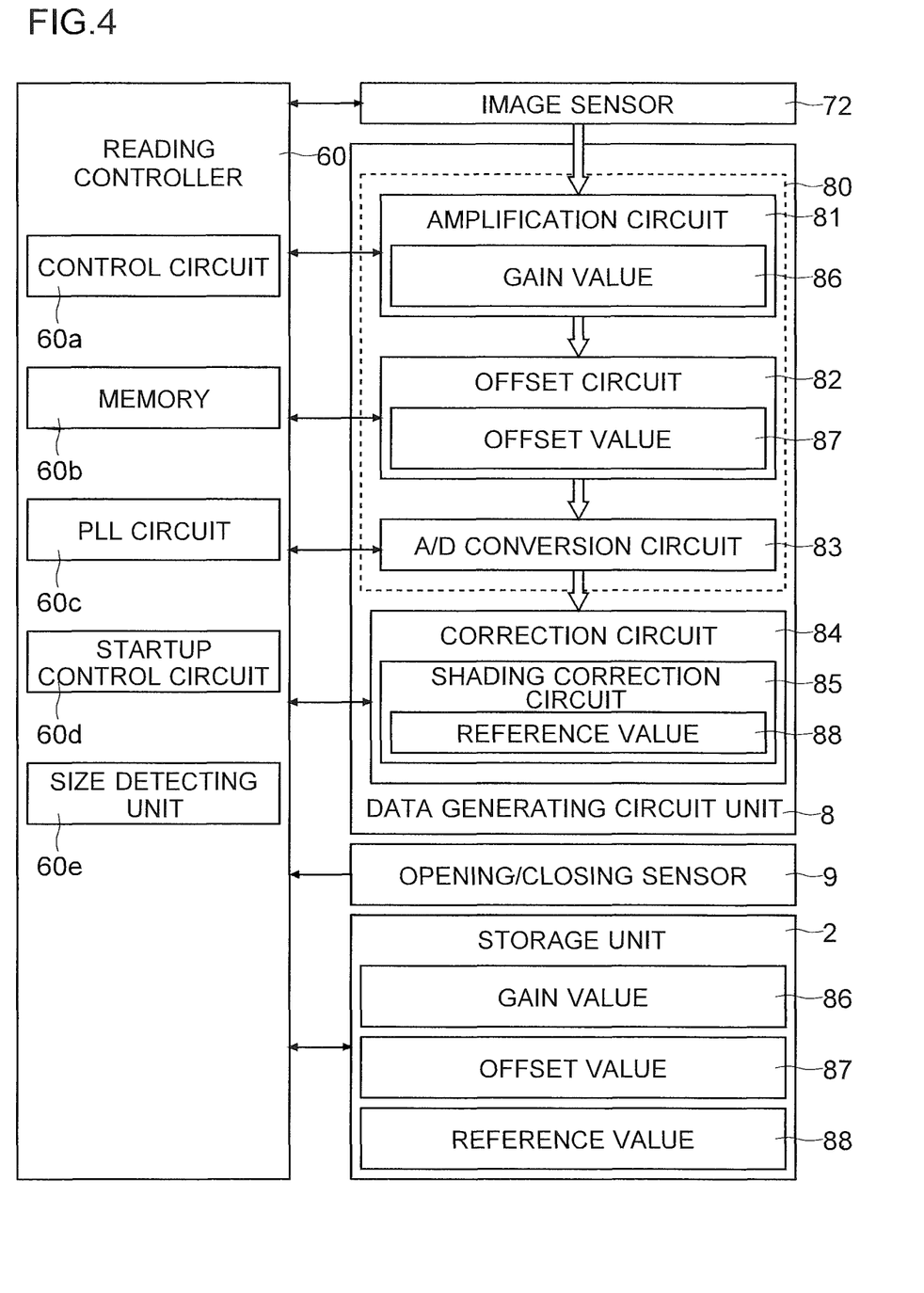
FIG. 4 is a diagram illustrating an example of a reading controller and an example of a data generating circuit unit according to the embodiment.

Next, by using FIG. 4, a description will be given of an example of the reading controller 60 and an example of the data generating circuit unit 8 according to the embodiment. FIG. 4 is a diagram illustrating an example of the reading controller 60 and an example of the data generating circuit unit 8 according to the embodiment.

The reading controller 60 includes a plurality of devices. For example, the reading controller 60 includes, as the devices, the control circuit 60a, the memory 60b, a PLL circuit 60c, and a startup control circuit 60d. The data generating circuit unit 8 also includes a plurality of devices. The data generating circuit unit 8 includes, as the devices, an amplification circuit 81, an offset circuit 82, an A/D conversion circuit 83, and a correction circuit 84.

The control circuit 60a is, for example, the CPU 11. The memory 60b stores data and a program for controlling the operation of the image reading unit 6. The control circuit 60a operates based on the data and the program stored in the memory 60b.

The PLL circuit 60c is a circuit that generates a signal having a frequency set in advance. For example, the PLL circuit 60c generates a charge-transfer clock signal for each light receiving element (the image sensor 72). The clock signal generated by the PLL circuit 60c is supplied to the image sensor 72. Here, the PLL circuit 60c may generate a clock signal for a synchronizing signal of the image sensor 72. The PLL circuit 60c may generate a clock signal for the operation of the control circuit 60a. The PLL circuit 60c may generate a clock signal for the operation of the memory 60b. A target (device) to which a signal generated by the PLL circuit 60c is determined in advance.

The startup control circuit 60d controls the startup of each device. When supply of electric power to the image reading unit 6 (the reading controller 60, the data generating circuit unit 8) is started, the devices are started up to operate in a predetermined order. For normal startup of the reading controller 60 and the data generating circuit unit 8, the order of supplying electric power to the devices is determined in advance. When main power supply is turned on, or when the power saving mode is canceled, supply of electric power to the image reading unit 6 is started. For example, the startup control circuit 60d is connected via a reset signal line with all or some of the devices. The startup control circuit 60d cancels a reset signal in a predetermined order. A device with respect to which the reset signal is canceled starts to perform startup processing.

The amplification circuit 81, the offset circuit 82, and the A/D conversion circuit 83 constitute a portion (an analog processing portion 80) that processes the analog image signal of the image sensor 72. The analog processing portion 80 is sometimes referred to as AFE.

An output of each light receiving element of the image sensor 72 is fed to the amplification circuit 81. The amplification circuit 81 amplifies the analog image signal from each light receiving element. The amplification circuit 81 stores therein a gain value 86. The amplification circuit 81 includes a memory (a setting register) in which to store the gain value 86. The reading controller 60 writes the gain value 86 into the memory. The reading controller 60 sets the gain value 86 (detailed description will be given later). The amplification circuit 81 amplifies the analog image signal with the set gain (amplification rate).

The amplified analog image signal is fed to the offset circuit 82. The offset circuit 82 adjusts the analog image signal by an amount of the output of each light receiving signal of the image sensor of a time when the lamp 71 is turned off. The offset circuit 82 stores therein an offset value 87. The offset circuit 82 includes a memory (setting register) in which to store the offset value 87. The reading controller 60 sets the offset value 87 (detailed description will be given later). The offset circuit 82 makes the analog image signal vary by an amount of the set offset value.

The analog image signal adjusted by the offset circuit 82 is fed to the A/D conversion circuit 83. The A/D conversion circuit 83 converts the received analog signal into a digital signal. The A/D conversion circuit 83 generates image data.

The generated image data is fed to the correction circuit 84. The image data sometimes suffers distortion ascribable to characteristics of the lamp 71, the image sensor 72, and the data generating circuit unit 8. The correction circuit 84 is a circuit that corrects distortion of the image data. For example, the correction circuit 84 includes a shading correction circuit 85. The correction circuit 84 may include another kind of correction circuit.

The shading correction circuit 85 performs shading correction based on a reference value set with respect to each light receiving element. The shading correction circuit 85 stores the reference value 88. The reference value 88 includes a white reference value and a black reference value. The reading controller 60 sets the reference value 88 (detailed description will be given later). The shading correction circuit 85 includes a memory (register) in which to store the reference value 88. The shading correction circuit 85 performs calculation for the shading correction based on the black reference value and the white reference value. An example of the calculation formula for the shading correction is as follows: Corrected pixel value=(uncorrected pixel value—black reference value)×{maximum pixel value/(white reference value—black reference value)}. Here, the shading correction circuit 85 may perform the shading correction by using another calculation formula.

(Opening/Closing Detection Performed with Respect to Document Holder)

Figure 5:
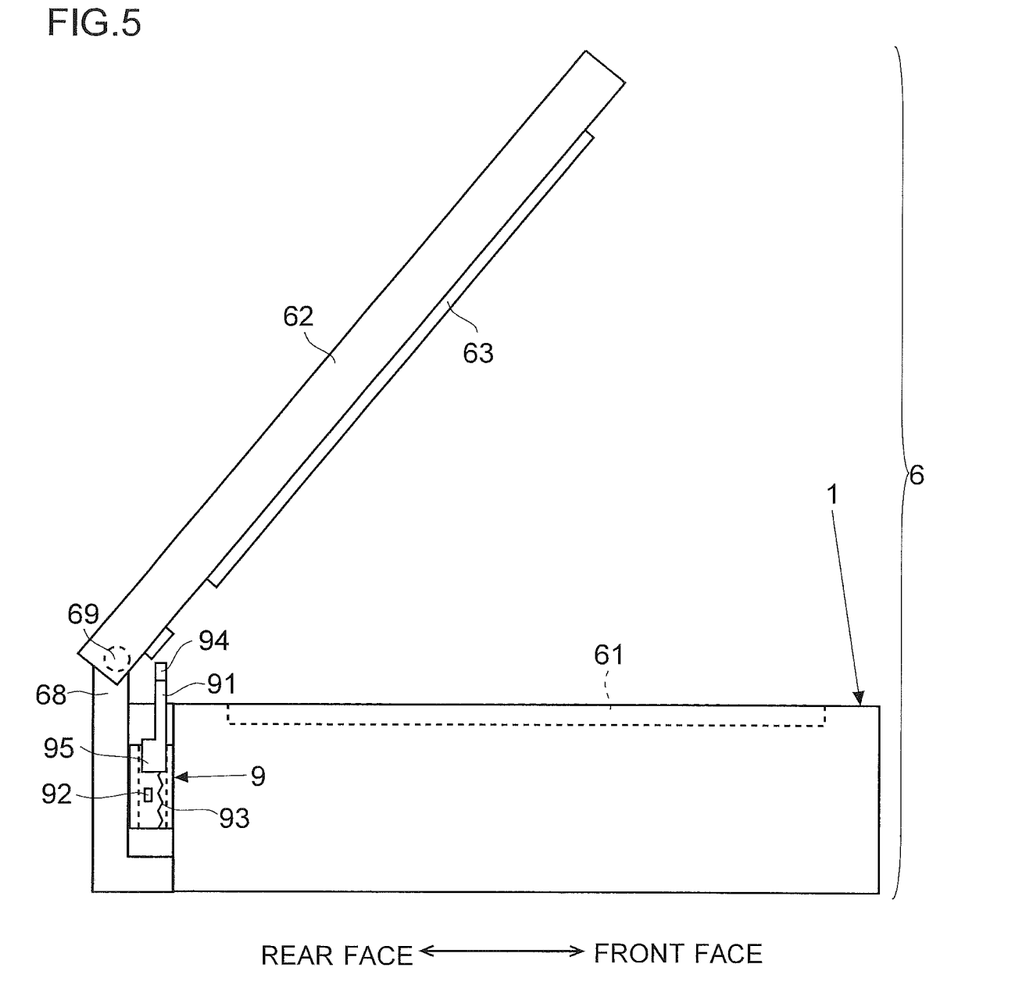
FIG. 5 is a diagram illustrating an example of opening/closing detection performed with respect to a document holder according to the embodiment.

Next, by using FIG. 4 and FIG. 5, a description will be given of an example of opening/closing detection performed with respect to the document holder 62 according to the embodiment. FIG. 5 is a diagram illustrating an example of the opening/closing detection performed with respect to the document holder 62 according to the embodiment.

As illustrated in FIG. 5, on a rear face of the image reading unit 6, there is provided a support member 68. The document holder 62 is attached to the support member 68. At an upper end of the support member 68, there is provided a rotation shaft 69. The rotation shaft 69 is put through an end portion of the document holder 62 on a rear-face side. Via the rotation shaft 69, the document holder 62 is so rotatable as to vertically swing on a front-face side of the multifunction peripheral 100. An end of the document holder 62 on the front-face side of the multifunction peripheral 100 is a free end. The document holder 62 can be in both open and closed positions with respect to an upper surface of the document glass 61.

As part of the document holder 62, the document holding plate 63 is provided. When the document holder 62 is closed (laid down), the document holding plate 63 covers the document glass 61. When the document holder 62 is completely closed, the document holding plate 63 and the document glass 61 are in contact with each other. When the document holder 62 is closed, the document holding plate 63 holds the document to prevent the document from moving.

Further, as illustrated in FIG. 5, the image reading unit 6 is provided with an opening/closing sensor 9. The opening/closing sensor 9 includes a contact member 91, a transmissive optical sensor 92, and a biasing member 93. The biasing member 93 biases the contact member 91 upward. Of the contact member 91, the vertical direction is the longitudinal direction of the contact member 91. The contact member 91 is a rod-shaped member. The contact member 91 changes its vertical position in response to the opening/closing of the document holder 62. In accordance as the document holder 62 is moved to open by being biased by the biasing member 93, the contact member 91 moves upward. Then, the contact member 91 comes to project from the upper surface of the image reading unit 6. On the other hand, in the course of closing the document holder 62, an upper end portion 94 of the contact member 91 comes into contact with a lower surface of the document holder 62. Then, the further the document holder 62 is closed (laid down), the more the contact member 91 is pushed down.

Further, a sensor interference portion 95 is provided below the contact member 91. The transmissive optical sensor 92 detects that the contact member 91 (the sensor interference portion 95) has reached a position equal to or lower than a predetermined position. In other words, the transmissive optical sensor 92 detects that the document holder 62 has been closed to an angle that is less than a predetermined angle. The transmissive optical sensor 92 includes a light emitting portion and a light receiving portion (of which neither is illustrated). Between the light emitting portion and the light receiving portion, the sensor interference portion 95 moves vertically. When the angle of the document holder 62 reaches the predetermined angle, an output level of the light receiving portion changes.

The predetermined angle is appropriately determined. The angle of the document holder 62 when it is completely closed is zero degrees. The predetermined angle is, for example, any angle in the range between 15° to 60°. The position of the contact member 91 is set such that the output level (High, Low) of the transmissive optical sensor 92 changes across the predetermined angle as a border. The biasing member 93 biases the contact member 91 such that the output level of the transmissive optical sensor 92 changes across the predetermined angle as a border.

The opening/closing sensor 9 (the transmissive optical sensor 92) provides an output of a first level when the document holder 62 is open by an angle that is equal to or more than the predetermined angle. When the document holder 62 is not open by an angle that is equal to or more than the predetermined angle, the opening/closing sensor 9 provides an output of a second level. When the first level is High level, the second level is Low level. When the first level is Low level, the second level is High level. The output of the opening/closing sensor 9 is fed to the reading controller 60. Based on the output of the opening/closing sensor 9, the reading controller 60 recognizes whether the document holder 62 is open by an angle that is equal to or more than the predetermined angle. Further, when a change has occurred from the second level to the first level, the reading controller 60 recognizes that the document holder 62 is open by an angle that is equal to or more than the predetermined angle. When a change has occurred from the first level to the second level, the reading controller 60 recognizes that the document holder 62 has been closed to an angle that is less than the predetermined angle.

(Document Size Detection)

Next, by using FIG. 4, a description will be given of an example of document size detection performed in the multifunction peripheral 100 according to the embodiment. A user puts a document on the document glass 61 with a side of the document to be read facing downward. In the multifunction peripheral 100, a reference point is set on the rear side, at the upper left corner, of the document glass 61, as seen from above. The user aligns the left upper corner of the document with the reference point. By reading part of the left end of the document, the reading controller 60 detects a length of the set document in the main scanning direction.

Specifically, when the document holder 62 is closed to an angle that is less than the predetermined angle from a state of being open by an angle that is equal to or more than the threshold angle, the reading controller 60 makes the reading unit 7 perform reading for document size detection. The reading controller 60 uses a change in the output level of the opening/closing sensor 9 as a trigger. In other words, when a change occurs from the first level to the second level, the reading controller 60 makes the reading unit 7 read the document glass 61 before the document holder 62 is completely closed.

For the reading for document size detection, the reading controller 60 makes the reading unit 7 move from its home position to a document size detection position. The document size detection position is below the document glass 61. For example, the document size detection position of the reading unit 7 is, as seen from above, a position at which the reading unit 7 reads a line that is a predetermined distance away from the left edge of the document glass 61. The predetermined distance can be, for example, any distance in a range from several millimeters to several centimeters.

Here, the home position of the reading unit 7 is determined in advance. The home position may be below the white reference plate 64. A home position sensor is provided which detects that the reading unit 7 is at the home position. After the reading is finished, the reading controller 60 makes the reading unit 7 return to the home position. When it is detected that the reading unit 7 has reached the home position, the reading controller 60 makes the scanning motor 67 stop operating.

The reading controller 60 includes a size detecting unit 60e. The size detecting unit 60e detects the size of the document in the main scanning direction. The size detecting unit 60e may be provided as hardware (circuit). Or, the size detecting unit 60e may be achieved in a software-based manner by the control circuit 60a and a program. The size detecting unit 60e detects the size based on image data (hereinafter referred to as "detection image data"), which is obtained by reading the left end portion of the document glass 61. During a reading before the document holder 62 is completely closed, light on an area where the document does not exist leaks out without being reflected. Pixels located in the part where the document does not exist has darker pixel values than pixels located in a part where the document exists. The size detecting unit 60e compares the pixel value of each pixel in the detection image data with a predetermined threshold value. Based on the comparison, the size detecting unit 60e determines the position of a border between a pixel range where the document has been read and a pixel range where the document does not exist. Here, the threshold value is stored in a storage device such as the memory 60b in a non-volatile manner.

Based on the border position, the size detecting unit 60e obtains the size (width) of the document in the main scanning direction. For example, the reading controller 60 counts the number of pixels from the pixel corresponding to the position of the reference point to the border position. The pitch of each pixel is determined by the reading resolution (when the resolution is 600 dpi, 25.4 [mm]÷ 600≈42.3 [μm] per pixel). Hence, the reading controller 60 multiplies the number of pixels existing from the pixel corresponding to the position of the reference point to the border position (that is, the number of pixels in the main scanning direction) by the pitch of one pixel. Thereby, the reading controller 60 obtains the size of the document in the main scanning direction.

(Active Mode and Power Saving Mode)

Figure 6:
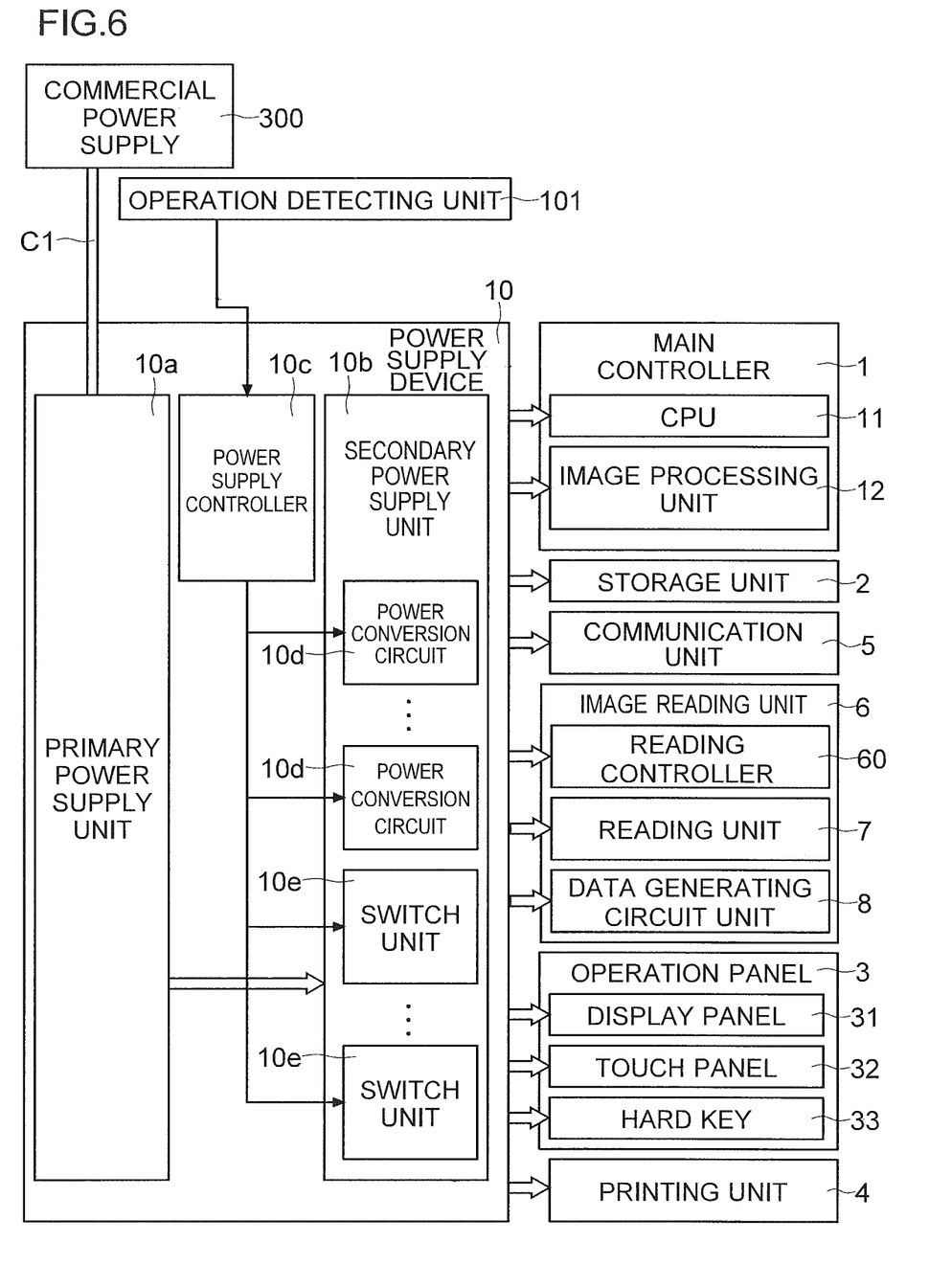
FIG. 6 is a diagram illustrating an example of supply of electric power in the multifunction peripheral according to the embodiment.

Next, by using FIG. 6, there will be described supply of electric power in the multifunction peripheral 100 according to the embodiment. FIG. 6 is a diagram illustrating an example of supply of electric power in the multifunction peripheral 100 according to the embodiment.

The multifunction peripheral 100 includes a power supply device 10. The power supply device 10 includes a primary power supply unit 10a, a secondary power supply unit 10b, and a power supply controller 10c. The primary power supply unit 10a is connected to a commercial power supply 300 via a power supply cord Cl. The primary power supply unit 10a generates a DC voltage from the commercial power supply 300 (an AC voltage). The primary power supply unit 10a generates a voltage set in advance. For example, the primary power supply unit 10a generates a DC24V for driving the motor.

The multifunction peripheral 100 includes various circuits and elements. Also, a plurality of kinds of voltages are necessary to operate the circuits and the elements. A plurality of kinds of voltages are necessary to operate the main controller 1, the storage unit 2, the operation panel 3, the printing unit 4, the communication unit 5, and the image reading unit 6. Hence, the secondary power supply unit 10b generates a plurality of kinds of DC voltages based on the voltage generated by the primary power supply unit 10a. The secondary power supply unit 10b includes a plurality of power conversion circuits 10d. The power conversion circuits 10d are each a DC converter or a regulator. The power conversion circuits 10d each have its output voltage set in advance.

The power supply controller 10c controls ON/OFF of each of the power conversion circuits 10d. The secondary power supply unit 10b generates a voltage of a level necessary to operate each portion. For example, the secondary power supply unit 10b generates and supplies voltages of levels necessary to operate the main controller 1 (the CPU 11, the image processing unit 12), the storage unit 2, the operation panel 3, the printing unit 4, the communication unit 5, and the image reading unit 6 (the reading controller 60, the reading unit 7, the data generating circuit unit 8).

There is a case where a portion to which electric power is supplied in the power saving mode and a portion to which power is not supplied in the power saving mode are both connected to one power supply line. To stop supply of electric power to such a portion where power is not to be supplied in the saving mode, a switch unit 10e is provided. The switch unit 10e is a switching element such as a transistor. The switch unit 10e includes a plurality of switch units 10e. The switch units 10e are each provided between a target to which electric power is supplied and a power conversion circuit 10d. The power supply controller 10c controls ON/OFF of each of the switch units 10e.

The multifunction peripheral 100 is operable in the active mode (normal mode) and in the power saving mode. The power saving mode is a mode in which less power is consumed than in the active mode. The power saving mode is sometimes referred to as energy saving mode, power consumption reducing mode, or sleep mode.

In the power saving mode, the power supply device 10 stops supply of electric power to supply-stop portions determined in advance. The supply-stop portions are appropriately determined. For example, the supply-stop portions are the main controller 1, the storage unit 2, part of the operation panel 3, the printing unit 4, and part of the image reading unit 6. In the image reading unit 6, the reading controller 60, the reading unit 7, and the data generating circuit unit 8 are supply-stop portions.

When a predetermined shifting condition for shifting to the power saving mode are fulfilled during an operation in the active mode, the main controller 1 makes the power supply device 10 shift to the power saving mode. A shifting condition for the shifting is appropriately determined. For example, an operation performed on a particular one (power consumption reducing key) of the hard keys 33 provided on the operation panel 34 may be determined as the shifting condition. Or, an excess of a time during which the operation panel 3 is not operated over a predetermined shifting period may be determined as the shifting condition. When the shifting condition is fulfilled, the main controller 1 gives a shifting instruction to the power supply device 10. On receiving the shifting instruction, the power supply device 10 stops supplying electric power to the supply-stop portions.

When a cancellation condition for cancelling the power saving mode is fulfilled during an operation in the power saving mode, the main controller 1 makes the power supply device 10 return to the active mode. The cancellation condition is appropriately determined. When the cancellation condition is fulfilled, the power supply device 10 restarts supplying electric power to the supply-stop portions. For example, in the active mode, the power supply controller 10c supplies electric power to all the portions of the multifunction peripheral 100.

The power supply controller 10c is connected to an operation detecting unit 101 via an interrupt signal line. An interrupt signal is fed to the power supply controller 10c. When the level of the interrupt signal changes during an operation in the power saving mode, the power supply controller 10c determines that the cancellation condition has been fulfilled. The operation detecting unit 101 is a portion that detects a certain operation or input performed with respect to the multifunction peripheral 100.

For example, the operation detecting unit 101 is the communication unit 5. On receiving printing data from the computer 200, the communication unit 5 makes the level of the interrupt signal change. Or, the operation detecting unit 101 may be the opening/closing sensor 9. The output of the opening/closing sensor 9 is fed to the power supply controller 10c. When the output level of the opening/closing sensor 9 has changed, the power supply controller 10c may determine that the cancellation condition has been fulfilled. Or, the operation detecting unit 101 may be the operation panel 3. When the touch panel 32 or any one of the hard keys 33 on the operation panel 3 is operated, the operation panel 3 makes the level of the interrupt signal change. The operation detecting unit 101 is not limited to the above examples. Another sensor or circuit may be used as the operation detecting unit 101.

Here, for making a determination on the cancellation condition, the power supply device 10 supplies electric power to the operation detecting unit 101 even in the power saving mode. The operation detecting unit 101 is excluded from the supply-stop portions. In the image reading unit 6, the opening/closing sensor 9 is excluded from the supply-stop portions.

(Giving Priority to Document Size Detection on Cancellation of Power Saving Mode)

Figure 7:
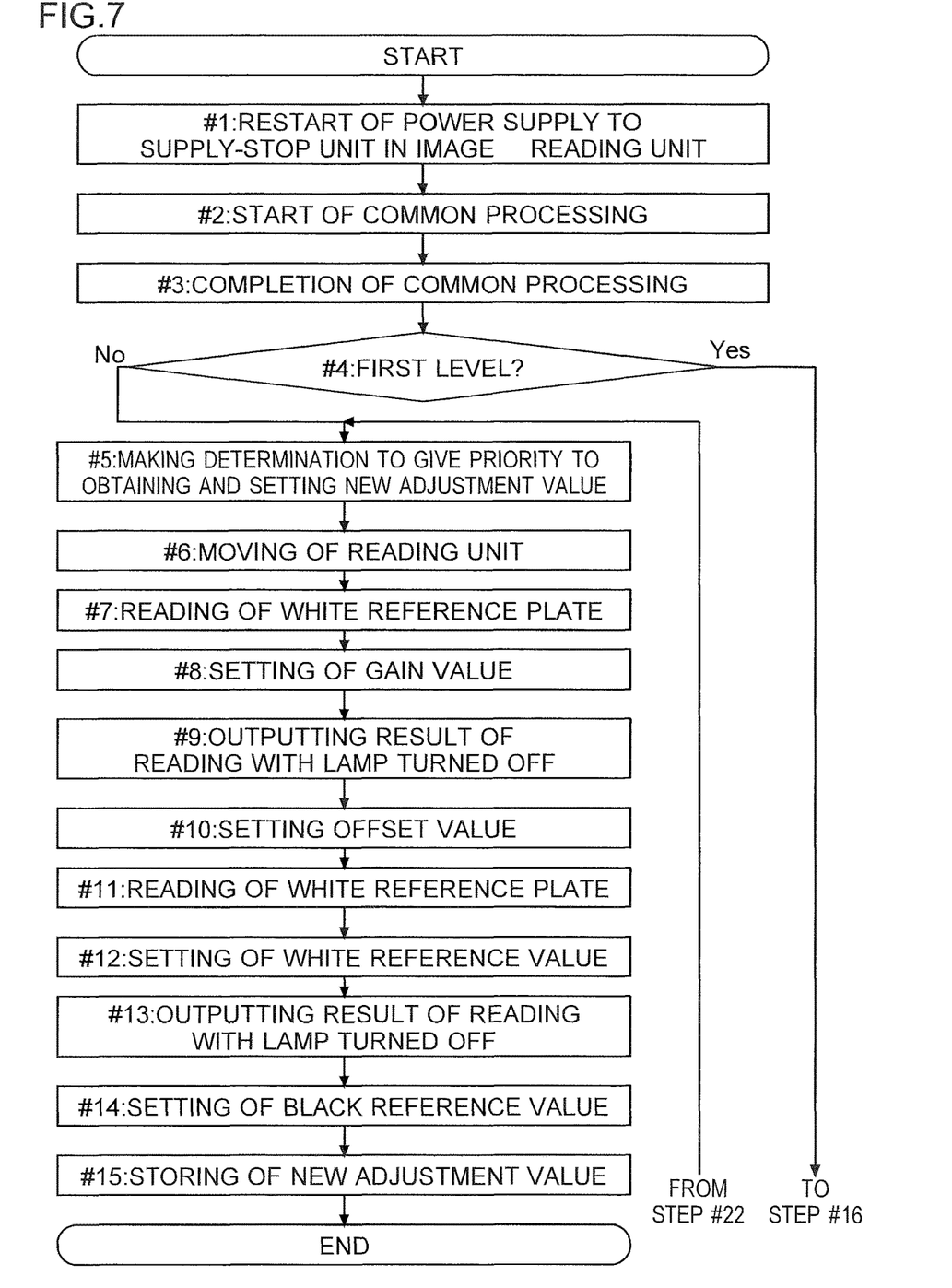
FIG. 7 is a diagram illustrating an example of processing performed when a power saving mode is cancelled in the multifunction peripheral according to the embodiment.
Figure 8:
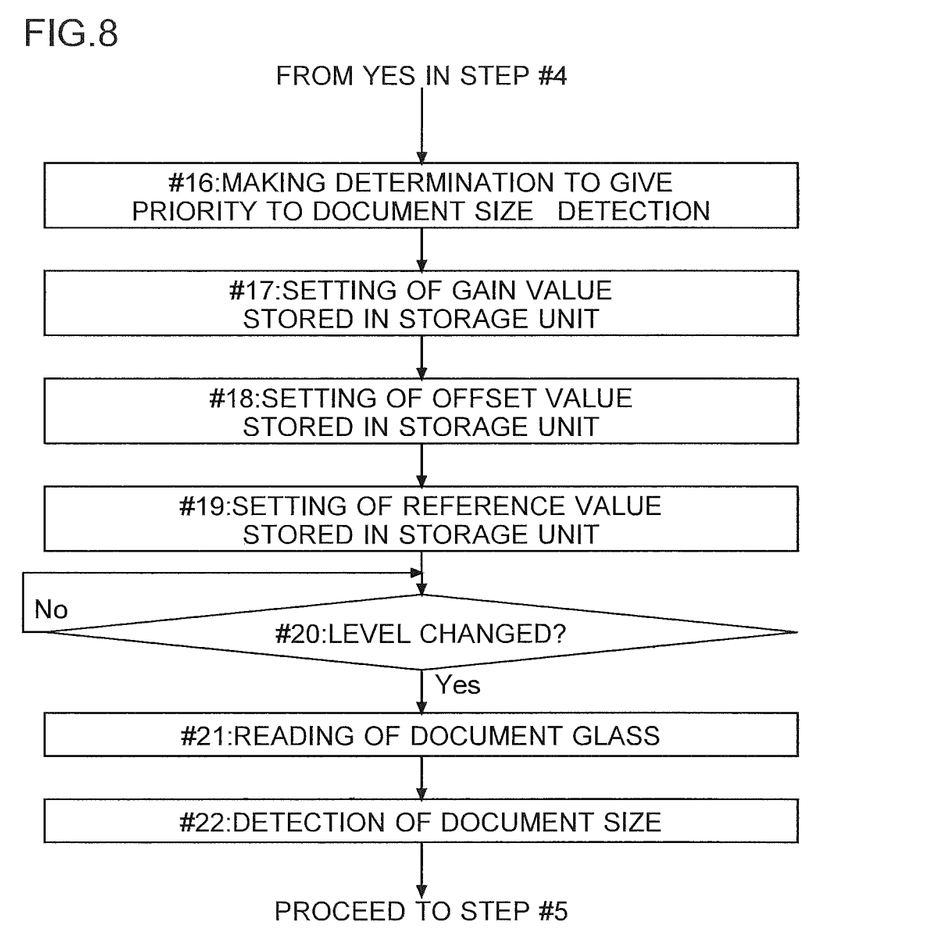
FIG. 8 is a diagram illustrating the example of processing performed when the power saving mode is cancelled in the multifunction peripheral according to the embodiment.

Next, by using FIG. 7 and FIG. 8, a description will be given of an example of how priority is given to document size detection in the multifunction peripheral 100 according to the embodiment. FIG. 7 and FIG. 8 are diagrams illustrating an example of processing performed at a time of cancelling the power saving mode in the multifunction peripheral 100 according to the embodiment.

When the power saving mode is cancelled, the reading controller 60, as part of the startup processing, determines new adjustment values. Then, the reading controller 60 sets the operation of the data generating circuit unit 8 by using the newly set adjustment values. The adjustment values include the gain value 86, the offset value 87, and the reference value 88. Determining new adjustment values and making a setting for the operation may take several seconds. In determining the new adjustment values, the reading unit 7 performs reading a plurality of times (details of which will be described later). Thus, document size detection is impossible while the new adjustment values are being determined and the setting for the operation is being made.

There is a case where, at the time of cancelling the power saving mode, a higher priority should be given to document size detection than to the obtaining of new adjustment values. For example, for cancellation of the power saving mode, the user may operate the operation panel 3. After operating the operation panel 3, the user may immediately set a document on the document glass 61, and close (bring down) the document holder 62. At this time, if, at the time point when the document holder 62 is closed to an angle that is less than the predetermined angle, the reading unit 7 is being used to obtain new adjustment values, it is impossible to detect the document size. To alleviate this inconvenience, the reading controller 60, at the time of cancelling the power saving mode, regardless of the reason (factor) for cancelling the power saving mode, makes an appropriate determination on whether priority should be given to document size detection.

Hereinafter, by using FIG. 7 and FIG. 8, a description will be given of an example of a flow of processing performed at a time of cancelling the power saving mode. "START" in FIG. 7 is a time point when the power saving mode is cancelled.

In response to the cancellation of the power saving mode, supply of electric power is restarted to the supply-stop portions in the image reading unit 6 (step #1). Then, the reading controller 60 executes common processing (step #2). The common processing is predetermined processing. The common processing includes processing for stabilizing, and enabling operations of, the reading controller 60, the data generating circuit unit 8, and the reading unit 7. The common processing is definable as preparation processing for using the reading unit 7.

For example, as the common processing, the startup control circuit 60d waits for a predetermined waiting time from when supply of electric power to the image reading unit 6 (the reading controller 60, the data generating circuit unit 8) is restarted. This is for the purpose of waiting for the power conversion circuit 10d that supplies electric power to the image reading unit 6 to become stable. After the waiting, the startup control circuit 60d performs processing of sequentially starting up the devices to operate, as the common processing. The startup control circuit 60d cancels resets in a predetermined order. With the resets cancelled, the control circuit 60a, the memory 60b, the PLL circuit 60c, the circuits included in the data generating circuit unit 8, and the circuits included in the reading unit 7 start up to operate.

Further, as the common processing, the control circuit 60a establishes communication with the memory 60b, the PLL circuit 60c, the startup control circuit 60d, the amplification circuit 81, the offset circuit 82, the A/D conversion circuit 83, and the correction circuit 84 (the shading correction circuit 85). Further, as the common processing, the control circuit 60a may check for malfunction of the image sensor 72 and malfunction of the lamp 71.

Further, as the common processing, the PLL circuit 60c performs processing of increasing the frequency of the clock signal to a set frequency (lock waiting). As the common processing, the control circuit 60a performs processing of checking whether phase lock in the PLL circuit 60c has been completed.

The predetermined common processing is completed soon (step #3). Then, the reading controller 60 checks whether the output level of the opening/closing sensor 9 is the first level (step #4). In other words, the reading controller 60 checks whether the document holder 62 is open by an angle equal to or more than the predetermined angle.

When the output level of the opening/closing sensor 9 is the second level (No in step #4), the reading controller 60 determines to give priority to the obtaining and setting of new adjustment values (step #5). When the document holder 62 is closed at the time point when the common processing is finished, it can be regarded that it is hardly likely that a document is going to be set. Thus, when the document holder 62 is at an angle that is less than the predetermined angle, the reading controller 60 gives priority to obtaining new adjustment values. The reading controller 60 obtains a gain value 86, an offset value 87, a white reference value, and a black reference value as adjustment values. The reading controller 60 may obtain a value other than these values as an adjustment value.

When obtaining (determining) new adjustment values, the reading controller 60 makes the reading unit 7 move to below the white reference plate 64 (step #6). Then, the reading controller 60 turns on the lamp 71. The reading controller 60 makes the reading unit 7 read the white reference plate 64 (step #7). Based on the result of the reading of the white reference plate 64, the reading controller 60 determines and sets a gain value 86 (step #8). For example, the reading controller 60 determines the gain value 86 such that the maximum value of the analog image signal of each pixel obtained by reading the white reference plate 64 agrees with, or slightly smaller than, the upper limit value of the conversion range (voltage range) of the A/D conversion circuit 83. Then, the reading controller 60 writes the determined gain value 86 into the memory (register) of the amplification circuit 81. This completes the obtaining and setting of the new gain value 86.

Next, the reading controller 60 turns off the lamp 71, and makes the reading unit 7 output a result of reading performed with the lamp 71 turned off (step #9). Based on the result of reading performed with the lamp 71 turned off, the reading controller 60 obtains and sets an offset value 87 (step #10). For example, the reading controller 60 determines the offset value 87 such that the minimum value of the analog image signal of each pixel obtained with the lamp 71 turned off agrees with the lower limit value of the conversion range (voltage range) of the A/D conversion circuit 83. Then, the reading controller 60 writes the determined offset value 87 into the memory (register) of the offset circuit 82. This completes the obtaining and setting of the new offset value 87.

Furthermore, the reading controller 60 turns on the lamp 71, and the reading controller 60 makes the reading unit 7 read the white reference plate 64 (step #11). Based on the result of the reading of the white reference plate 64, the reading controller 60 obtains and sets a white reference value (step #12). For example, the reading controller 60 determines a digital value of the analog image signal of each pixel obtained by reading the white reference plate 64 as the white reference value. Then, the reading controller 60 writes the determined white reference value into the memory (register) of the shading correction circuit 85. This completes the obtaining and setting of the new white reference value.

Next, the reading controller 60 turns off the lamp 71, and makes the reading unit 7 output a result of reading performed with the lamp 71 turned off (step #13). Based on the result of the reading performed with the lamp 71 turned off, the reading controller 60 obtains and sets a black reference value (step #14). For example, the reading controller 60 determines a digital value of the analog image signal of each pixel obtained with the lamp 71 turned off as the black reference value. Then, the reading controller 60 writes the determined black reference value into the memory (register) of the shading correction circuit 85. This completes the obtaining and setting of the new black reference value.

Then, the reading controller 60 makes the storage unit 2 (or the memory 60b) store the newly set adjustment values in a non-volatile manner (step #15). The reading controller 60 makes the storage unit 2 update each adjustment value. Each time the reading controller 60 determines new adjustment values, the reading controller 60 rewrites the adjustment values stored in the storage unit 2. The flow then ends (EA/D).

On the other hand, when the output level of the opening/closing sensor 9 is the first level (Yes in step #4), the flow proceeds to step #16. Specifically, the reading controller 60 determines to give priority to document size detection (step #16). When the document holder 62 is open at a time point when the common processing is finished, it can be regarded that it is highly likely that a document is going to be set. Thus, when the document holder 62 is at an angle that is equal to or more than the predetermined angle, the reading controller 60 gives a higher priority to document size detection than to the obtaining of new adjustment values.

At this time, the reading controller 60 sets the gain value 86 stored in the storage unit 2 (step #17). As described above, each time the reading controller 60 determines a new gain value 86, the reading controller 60 makes the storage unit 2 update the gain value 86. In the case where priority is given to document size detection, the gain value 86 stored in the storage unit 2 is a gain value 86 that has been set before shifting to the power saving mode. The reading controller 60 writes a previous gain value 86 into the memory of the amplification circuit 81. The reading controller 60, by using the previous gain value 86, makes a setting for the operation of the amplification circuit 81.

Further, the reading controller 60 sets the offset value 87 stored in the storage unit 2 (step #18). As described above, each time the reading controller 60 sets a new gain value 86, the reading controller 60 makes the storage unit 2 update the offset value 87. Thus, in the case where priority is given to document size detection, the offset value 87 stored in the storage unit 2 is an offset value 87 that has been set before shifting to the power saving mode. The reading controller 60 writes a previous offset value 87 into the memory of the offset circuit 82. The reading controller 60, by using the previous offset value 87, makes a setting for the operation of the offset circuit 82.

Further, the reading controller 60 sets the reference value 88 (the white reference value, the black reference value) stored in the storage unit 2 (step #19). As described above, each time the reading controller 60 sets a new reference value 88, the reading controller 60 makes the storage unit 2 update the reference value 88. Thus, in the case where priority is given to document size detection, the reference value 88 stored in the storage unit 2 is a reference value 88 that has been set before shifting to the power saving mode. The reading controller 60 writes a previous reference value into the memory of the shading correction circuit 85. The reading controller 60, by using the previous reference value 88, makes a setting for the operation of the shading correction circuit 85.

The adjustment values may be different between before and after shifting to the power saving mode. However, the difference is seldom drastic, and thus, even with previous adjustment values, accurate document size detection is possible. Then, the reading controller 60 continues checking whether the output level of the opening/closing sensor 9 has changed from the first level to the second level (step #20, from No in step #20 to step #20). Now that the document holder 62 is open, the document holder 62 will eventually be closed. The reading controller 60 waits for the document holder 62 to be closed.

When the output level of the opening/closing sensor 9 has changed from the first level to the second level (Yes in step #20), the reading controller 60 makes the reading unit 7 read the document glass 61 (step #21). At this time, the reading controller 60 makes the scanning motor 67 operate. Then, the reading controller 60 makes the document glass 61 move to below the reading unit 7.

Then, based on image data obtained by the reading, the reading controller 60 detects the size of the document in the main scanning direction (step #22). Then, the flow proceeds to step #5. When priority is given to document size detection, after the document size detection is completed, the reading controller 60 determines the adjustment values. Further, the reading controller 60 sets the adjustment values.

Thus, the image reading apparatus according to the embodiment includes the document stage (the document glass 61), the reading controller 60, the reading unit 7, the data generating circuit unit 8, the document holder 62, the opening/closing sensor 9, the power supply device 10, and the storage unit 2. The reading unit 7 includes the image sensor 72, and reads a document set on the document stage. The data generating circuit unit 8 generates image data based on an output of the image sensor 72. The document holder 62 is openable and closable, and holds the document stage. The opening/closing sensor 9 provides an output of the first level when the document holder 62 is open by an angle equal to or more than the predetermined angle. The opening/closing sensor provides an output of the second level when the document holder is not open by an angle equal to or more than the predetermined angle. The power supply device 10 stops supply of electric power to the reading controller 60 and the data generating circuit unit 8 in the power saving mode. The power supply device 10 supplies electric power to the reading controller 60 and to the data generating circuit unit 8 in the active mode. The storage unit 2 stores the adjustment values used for making a setting of the operation of the data generating circuit unit 8. When a return is made from the power saving mode to the active mode, the reading controller 60 performs the predetermined common processing. The reading controller 60 checks the output of the opening/closing sensor 9 when the common processing is completed. When the output level of the opening/closing sensor 9 is the first level, the reading controller 60, based on the adjustment values stored in the storage unit 2, makes a setting for the operation of the data generating circuit unit 8. The reading controller 60, after making the setting, makes the reading unit 7 perform reading for document size detection. The reading controller 60, based on the result of the reading, detects the size of the document. The common processing includes processing of stabilizing, and enabling operations of, devices included in the reading controller 60 and in the data generating circuit unit 8.

Thereby, it is possible to determine whether to give priority to document size detection at a time point when the common processing is completed, regardless of the reason (return factor) for cancelling the power saving mode. When the document holder 62 is open at a time point when the common processing is completed, it is highly likely that the user wants document reading to be performed. It is possible to give priority to document size detection when document size detection should be done first. It is possible to appropriately determine whether to give priority to document size detection. When the user wants automatic detection of the document size, he or she does not have to wait for the setting of the adjustment values to be completed.

When the output level of the opening/closing sensor 9 on completion of the common processing is the second level, the reading controller 60 does not detect the size of the document, but makes the reading unit 7 perform reading for newly determining the adjustment values, and based on the newly determined adjustment values, the reading controller 60 makes a setting for the operation of the data generating circuit unit 8. When the document holder 62 is closed at a time point when the common processing is completed, it is highly likely that the user is not going to set a document. When the need of giving priority to document size detection is small, it is possible to give priority to the obtaining of the new adjustment values and to the making of setting for the data generating circuit unit 8.

When the output level of the opening/closing sensor 9 on completion of the common processing is the first level, the reading controller 60, after detecting the size of the document, makes the reading unit 7 perform reading for newly determining the adjustment values, and based on the newly determined adjustment values, the reading controller 60 makes a setting for the operation of the data generating circuit unit 8. Thereby, it is possible to obtain new adjustment values and make a setting for the data generating circuit unit 8 after detecting the size of the document. It is possible to improve the quality of the image data obtained by the reading of the document.

When the output level of the opening/closing sensor 9 has changed from the first level to the second level, the reading controller 60 makes the reading unit 7 read the document stage, and, based on the image data obtained by the reading, detects the size of the document in the main scanning direction. Thereby, it is possible to execute reading for document size detection at a time point when the document holder 62 is closed to some extent. This makes it easy to recognize a border between a part where the document exists and a part where the document does not exist. It is possible to correctly detect the size of the document.

The data generating circuit unit 8 includes the amplification circuit 81, the offset circuit 82, and the shading correction circuit 85. The reading controller 60, as the adjustment values, determines the gain value 86 used to make a setting for the amplification circuit 81, the offset value 87 used to make a setting for the offset circuit 82, and the reference value 88 used to make a setting for the shading correction circuit 85. The reading controller 60 makes the storage unit 2 store a newly determined gain value 86, offset value 87, and reference value 88 in a non-volatile manner. Thereby, it is possible to determine whether to perform the common processing at the time when it becomes possible to use the amplification circuit 81, the offset circuit 82, and the shading correction circuit 85. Further, when priority should be given to document size detection, it is possible to perform document size detection without determining new gain value 86, offset value 87, and reference value 88. It is possible to make the storage unit 2 store the newest adjustment values.

The reading controller 60 includes the control circuit 60a, the memory 60b, the PLL circuit 60c, and the startup control circuit 60d. When supply of electric power to the reading controller 60 and supply of electric power to the data generating circuit unit 8 are restarted, the startup control circuit 60d sequentially performs reset cancellation as the common processing, and thereby makes the control circuit 60a, the memory 60b, the PLL circuit 60c, and the circuits included in the data generating circuit unit 8 start up to operate. Further, as the common processing, the control circuit 60a establishes communication with the memory 60b, the PLL circuit 60c, the startup control circuit 60d, the amplification circuit 81, the offset circuit 82, the A/D conversion circuit 83, and the shading correction circuit 85. The PLL circuit 60c, as the common processing, performs processing of increasing the frequency of the clock signal to a set frequency. Thus, processing necessary for document size detection and adjustment-value setting may be performed as the common processing.

It should be understood that the scope of the present invention is not limited to the above discussed embodiments, and that the present invention is implementable with various modifications and changes without departing from the gist of the invention.

INDUSTRIAL APPLICABILITY

The present invention is usable in image reading apparatuses (image forming apparatuses).

The invention claimed is:

1. An image reading apparatus comprising:
a document stage;
a reading controller;
a reading unit which includes an image sensor and reads a document set on the document stage;
a data generating circuit unit which generates image data based on an output of the image sensor;
a document holder which is openable and closable and holds the document stage;
an opening/closing sensor which provides an output of a first level when the document holder is open by an angle equal to or more than a predetermined angle, and which provides an output of a second level when the document holder is not open by an angle equal to or more than the predetermined angle;
a power supply device which stops supply of electric power to the reading controller and the data generating circuit unit in a power saving mode, and which supplies electric power to the reading controller and to the data generating circuit unit in an active mode; and
a storage unit which stores an adjustment value for making a setting for an operation of the data generating circuit unit,
wherein
in a case where a return is made from the power saving mode to the active mode,
the reading controller
performs predetermined common processing,
checks an output of the opening/closing sensor on completion of the common processing,
makes the setting for the operation of the data generating circuit unit based on the adjustment value stored in the storage unit when an output level of the opening/closing sensor is the first level,
makes the reading unit perform reading for document size detection after making the setting, and
detects a size of the document based on a result of the reading, and the common processing includes processing for stabilizing, and enabling operations of, a device included in the reading controller and a device included in the data generating circuit unit.

2. The image reading apparatus according to claim 1, wherein
when the output level of the opening/closing sensor on completion of the common processing is the second level, the reading controller,
without detecting the size of the document, makes the reading unit perform reading for newly determining the adjustment value, and,
based on the adjustment value determined anew, makes a setting for the operation of the data generating circuit unit.

3. The image reading apparatus according to claim 1, wherein
when the output level of the opening/closing sensor on completion of the common processing is the first level, the reading controller,
after detecting the size of the document, makes the reading unit perform reading for newly determining the adjustment value, and,
based on the adjustment value determined anew, makes a setting for the operation of the data generating circuit unit.

4. The image reading apparatus according to claim 1, wherein
when the output level of the opening/closing sensor has changed from the first level to the second level, the reading controller
makes the reading unit read the document stage, and, based on image data obtained by the reading, detects a size of the document in a main scanning direction.

5. The image reading apparatus according to claim 1, wherein the data generating circuit unit includes an amplification circuit, an offset circuit, and a shading correction circuit, and the reading controller determines, as the adjustment value, a gain value used for making a setting for the amplification circuit, an offset value used for making a setting for the offset circuit, and a reference value used for making a setting for the shading correction circuit, and makes the storage unit store, in a non-volatile manner, the gain value, the offset value, and the reference value that are determined anew.

6. The image reading apparatus according to claim 5, wherein the reading controller includes a control circuit, a memory, a PLL circuit, and a startup control circuit, and when supply of electric power to the reading controller and supply of electric power to the data generating circuit unit are restarted, the startup control circuit, as the common processing, sequentially performs reset cancellation to thereby perform processing of making the control circuit, the memory, the PLL circuit, and a circuits included in the data generating circuit unit start up to operate.

7. The image reading apparatus according to claim 6, wherein the control circuit performs, as the common processing, establishment of communication with the memory, the PLL circuit, the amplification circuit, the offset circuit, the A/D conversion circuit, and the shading correction circuit.

8. The reading apparatus according to claim 6, wherein the PLL circuit performs, as the common processing, processing of increasing a frequency of a clock signal to a set frequency.

9. The image reading apparatus according to claim 1, further comprising a white reference plate, wherein in determining a new adjustment value, the reading controller makes the reading unit read the white reference plate.

10. A method for controlling an image reading apparatus, the method comprising:

reading a document set on a document stage by using an image sensor;

generating image data based on an output of the image sensor;

making a document holder, which holds the document stage, openable and closable;

making an opening/closing sensor provide an output of a first level when the document holder is open by an angle equal to or more than a predetermined angle and making the opening/closing sensor provide an output of a second level when the document holder is not open by an angle equal to or more than the predetermined angle;

stopping supply of electric power to a reading controller and a data generating circuit unit in a power saving mode, and supplying electric power to the reading controller and to the data generating circuit unit in an active mode;

storing an adjustment value for making a setting for an operation of the data generating circuit unit;

making the reading controller perform predetermined common processing in a case where a return is made from the power saving mode to the active mode;

checking an output of the opening/closing sensor on completion of the common processing;

making a setting for an operation of the data generating circuit unit based on the adjustment value stored in the storage unit when an output level of the opening/closing sensor is the first level;

after making the setting, making the reading unit perform reading for document size detection;

detecting a size of the document based on a result of the reading; and the common processing being processing for stabling, and enabling operations of, a device included in the reading controller and a device included in the data generating circuit unit.

* * * * *